United States Patent [19]

Santandrea et al.

[11] Patent Number: 4,984,353
[45] Date of Patent: Jan. 15, 1991

[54] PRODUCTION LINE FOR ELECTRIC MOTOR SUBASSEMBLIES

[75] Inventors: Luciano Santandrea, Tavarnelle Val di Pesa; Massimo Lombardi, Casellina, both of Italy

[73] Assignee: Axis S.p.A., Tavernelle Val di Pesa, Italy

[21] Appl. No.: 437,777

[22] Filed: Nov. 20, 1989

Related U.S. Application Data

[63] Continuation of Ser. No. 324,599, Mar. 16, 1989, abandoned.

[30] Foreign Application Priority Data

Sep. 16, 1988 [IT] Italy .................................. 67824 A/88

[51] Int. Cl.$^5$ .......................................... H02K 15/085
[52] U.S. Cl. ................................... 29/714; 29/596; 29/732; 29/564.1; 29/736; 242/7.09; 242/7.11; 242/35.5 A
[58] Field of Search ................ 29/596, 598, 732, 736, 29/564.1, 564.6, 564.8, 714; 242/7.03, 7.09, 7.10, 1.1 R, 35.5 A; 198/346.1, 346.2, 341, 365, 358, 465.1

[56] References Cited

U.S. PATENT DOCUMENTS

| | | | |
|---|---|---|---|
| 3,854,889 | 12/1974 | Lemelson | 29/33 P |
| 4,237,598 | 12/1980 | Williamson | 29/568 |
| 4,460,966 | 7/1984 | Chynoweth et al. | 364/468 |
| 4,473,883 | 9/1984 | Yoshida et al. | 364/474 |
| 4,713,883 | 12/1987 | Santandrea et al. | 29/736 |
| 4,768,727 | 9/1988 | Santandrea et al. | 242/7.05 R |
| 4,815,673 | 3/1989 | Wheeler | 29/732 X |

Primary Examiner—Carl E. Hall
Attorney, Agent, or Firm—Eric C. Woglom; Jeffrey H. Ingerman

[57] ABSTRACT

A production line capable of producing more than one variation of a particular type of electric motor component (e.g., more than one variation of armature or more than one variation of stator) is provided. The line includes at each workstation either a machine adjustable to the different variations to be produced, or more than one machine. Workpieces are carried down the line on coded pallets from which it can be determined automatically which variation it is, so that the workstation can be adjusted to perform the correct operation, or so that the pallet can be directed to the correct machine.

11 Claims, 6 Drawing Sheets

PRODUCTION LINE FOR ELECTRIC MOTOR SUBASSEMBLIES

This is a continuation of application Ser. No. 07/324,599, filed Mar. 16, 1989, entitled "Production Line for Electric Motor Subassemblies," now abandoned.

BACKGROUND OF THE INVENTION

This invention relates to a production line for electric motor or generator subassemblies. (As used hereinbelow, the word "motor" should be understood to include both motors and generators.) In particular, this invention relates to a production line for electric motor components such as armatures or stators. More particularly, this invention relates to a production line for manufacturing more than one variation of a particular type of electric motor component—e.g., more than one variation of armature or more than one variation of stator.

Either type of electric motor component can come in different variations. These variations can be in size (either in length or diameter) or in other characteristics—e.g., number of arms in the case of an armature or number of poles in the case of a stator. Although the various steps and types of machines needed for assembling the different variations are the same, in most cases they must be adjusted differently for each variation. Thus, with presently known production lines only one variation of the particular type of electric motor component being worked on can be made at any one time.

As a result, the production of different variations of a particular type of electric motor component requires either an investment in multiple production lines so that different lines can operate at the same time to produce the different variations, or significant down-time while various machines on the production line are adjusted or changed to produce a different variation.

It would be desirable to be able to provide a production line capable of producing more than one variation of a particular type of electric motor component.

SUMMARY OF THE INVENTION

It is an object of this invention to provide a production line capable of producing more than one variation of a particular type of electric motor component.

In accordance with this invention, there is provided a production line for producing at least two variations of a type of electric motor component. The production line comprises a plurality of workstations for producing electric motor components, each workstation having either (a) at least one machine capable of working on at least two of the variations of the particular type of electric motor component, or (b) at least two machines for working on electric motor components, each of the at least two machines being capable of working on different ones of the at least two variations of the particular type of electric motor component. The production line also includes conveyor means for transporting the electric motor components between the workstations, and pallet means for supporting the electric motor components during transportation by the conveyor means and during working at the workstations. determines which variation of the particular type of electric motor component is present at the workstation. Responsive to that determination, a machine at the workstation is adjusted to work on that variation if the workstation has a machine capable of working on at least two variations of the particular type of electric motor component, or the pallet is directed to an appropriate machine if the workstation has a plurality of machines each capable of working on different variations of the particular type of electric motor component.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The present invention allows a single production line to be used to produce two or more variations of a particular type of electric motor component—e.g., two or more variations of armature or two or more variations of stator—without having to stop the production line to adjust any of the workstations.

Each workstation in a production line according to the invention either has a machine that is automatically adjustable—e.g., pneumatically—to each variation to be produced, or has a plurality of machines corresponding to the number of variations. If there are more than two variations, there could be one machine capable of adjustment to all variations or a number of non-adjustable machines equal to the number of variations, or it is possible that there might be one machine capable of adjustment to some of the variations, and one or more additional machines capable of adjustment to the remaining variations.

The workpiece—i.e., the armature or stator being made—is carried along the production line by a conveyor while mounted on a pallet, which may carry one or more workpieces. The pallet is encoded in a known way with information regarding the workpiece or workpieces it is carrying. The encoded information would include an identification of the variation being produced, as well as other information such as steps to be performed, status of each step, whether or not the workpiece is to be rejected, etc. The information can be encoded magnetically, electronically, mechanically, or electromechanically in known ways, and a suitable reading device is provided adjacent each workstation to read the information. Based on the information, and assuming that the workpiece is not coded as a reject, the workstation will be adjusted to the indicated variation if it is of the adjustable type, or the pallet carrying workpiece will be directed to an appropriate machine at the workstation if the workstation is of the type having multiple machines. One way of transferring the pallet to the correct machine is described below in connection with the preferred embodiments.

Figure 1:
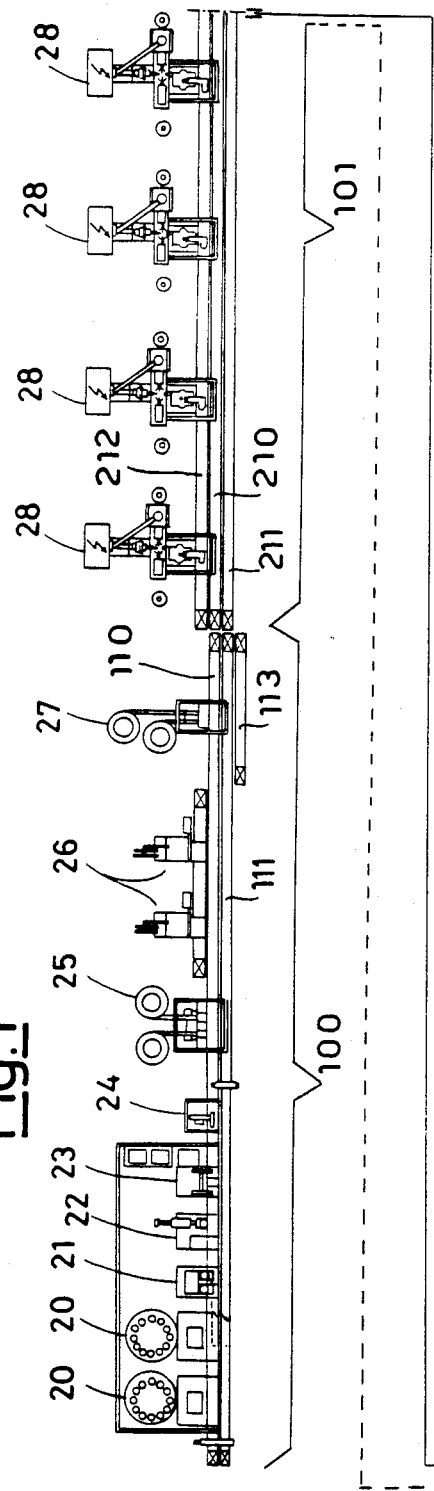
FIG. 1 is a schematic plan view of a production line according to the invention for manufacturing armatures.
Figure 1:
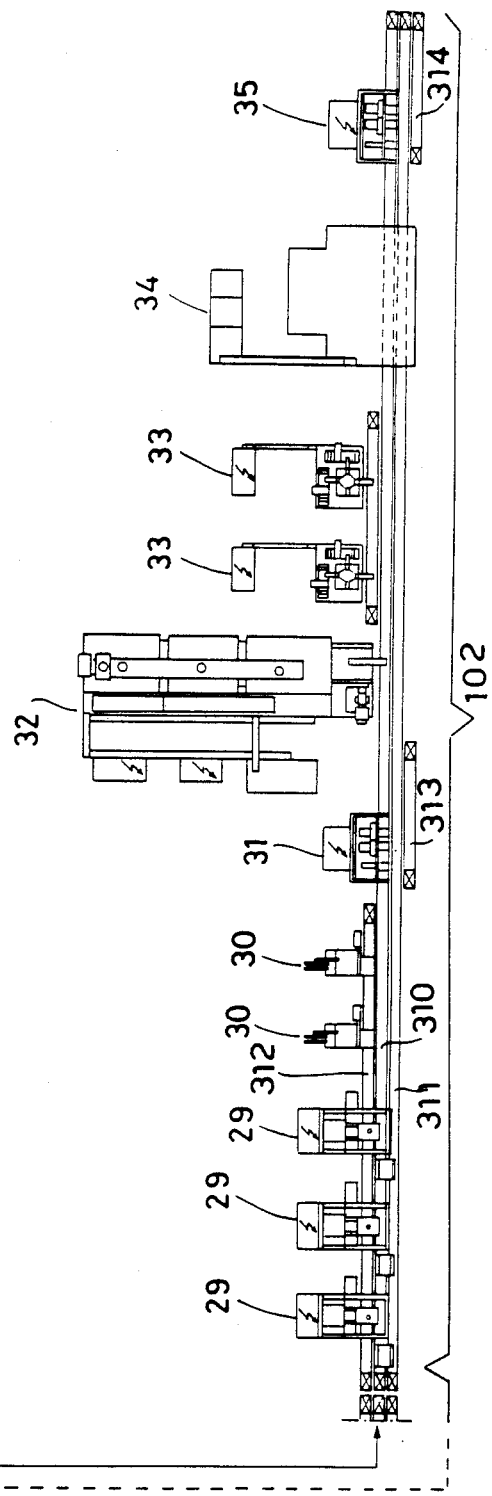
Figure 2:
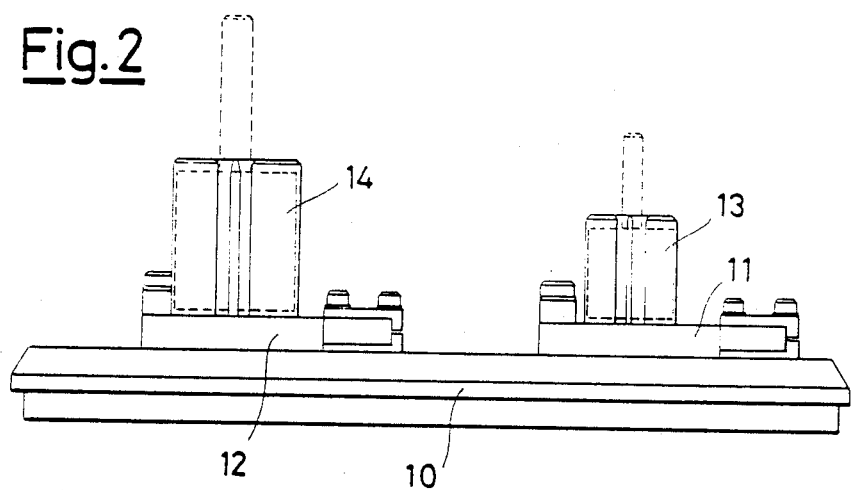
FIG. 2 is a side elevational view of a pallet for carrying an armature with its axis vertical, with an armature shown in phantom.
Figure 3:
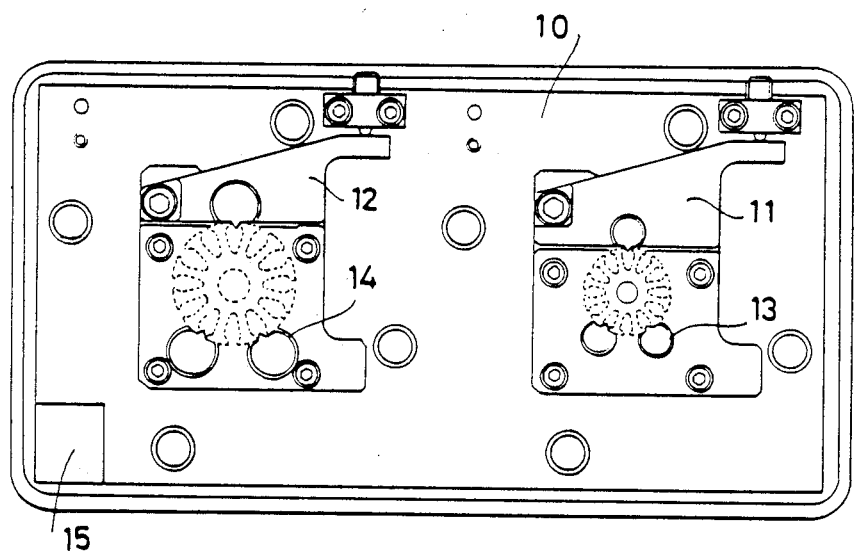
FIG. 3 is a plan view of a pallet for carrying an armature with its axis vertical, with an armature shown in phantom.

A preferred embodiment of a production line for the production of two variations of armatures is illustrated in FIG. 1, and has three sections 100, 101 and 102. As they travel through the first part of section 100, the armatures must travel with their spin axes vertical. For that purpose, pallet 10, illustrated in FIGS. 2 and 3, is provided. Pallet 10 has two fixed supports 11, 12, respectively having fixed heads 13, 14 of different sizes for holding armatures 130, 140 of different dimensions (shown in phantom). Pallet 10 also includes an encoding element 15 where the information relating to the armature or armatures carried by pallet 10, referred to above, is stored.

Pallets 10 are carried through section 100 of the production line of FIG. 1 on conveyor 110. The armature production line of FIG. 1 begins with a lamination stacking station having two lamination selection units 20 for selecting and stacking armature laminations, one unit 20 for each variation of armature. The armature laminations are stacked on pallet 10 by one of the units 20 according to the information stored by element 15. After the armature laminations are stacked at station 20, the height of the stack of laminations is checked at stack height control station 21 adjustable to either variation of armature, and if the stack height is not correct, stack height control station 21, is capable of either removing laminations from, or adding laminations to, the stack as necessary. Next, shaft placing station 23 inserts the armature shaft along the spin axis. If the armature is to be double insulated, a second shaft placing station 22 can be provided for placing an insulating tube, e.g. of poligon, into the armature stack before the shaft is inserted by station 23. An automatic shaft distribution system assures that the correct type of shaft for the variation being produced is inserted.

Figure 4:
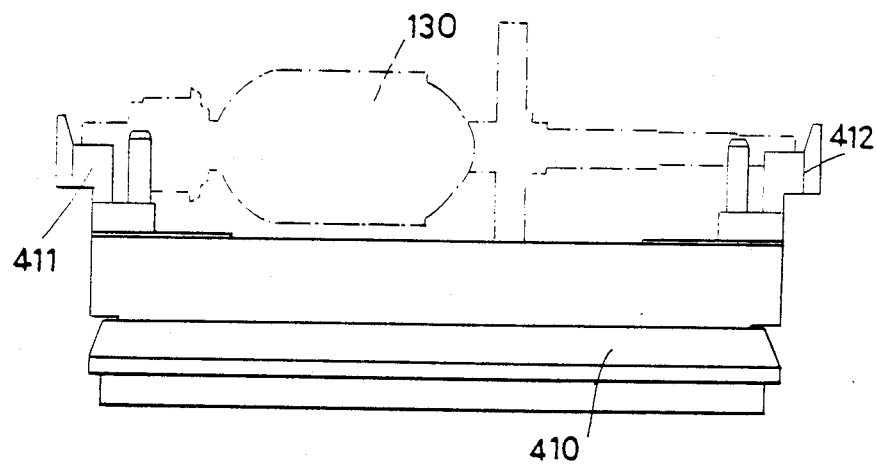
FIG. 4 is a side elevational view of a pallet for carrying an armature with its axis horizontal, with an armature shown in phantom.
Figure 5:
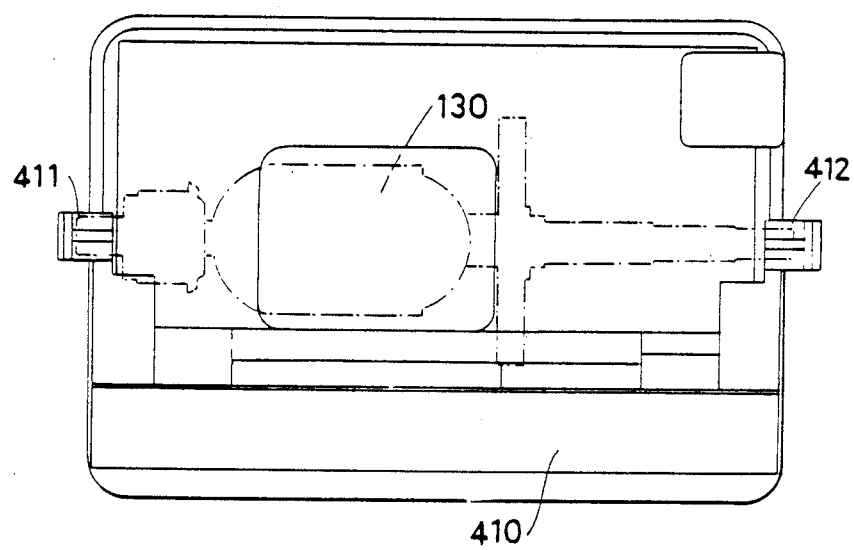
FIG. 5 is a plan view of a pallet for carrying an armature with its axis horizontal, with an armature shown in phantom.

After station 23, the armatures must travel with their spin axes horizontal. Therefore, transfer station 24 is provided to remove both variations of armatures from pallets 10 and transfer them to pallets 410, illustrated in FIGS. 4 and 5. Each of pallets 410 holds only one armature horizontally on supports 411, 412 which are adjustable longitudinally to support both variations of armatures 130 (shown in phantom) and 140 (not shown). Transfer station 24 also moves pallets 10 from conveyor 110 to return conveyor 111 which returns them to the beginning of the production line for reuse. If the production line is being used to produce both variations 130, 140 of armature at the same time, then, depending on the order in which the two variations are being produced, a pallet 10 may be carrying both variations of armature. However, a pallet 410 can never carry more than one variation of armature.

Station 25 fits the armatures with plastic end fibers. This station can handle both variations of armatures, and has two vibratory feeders, one for the type of end fibers required by each variation of armature. Station 26 includes two machines, one for each variation of armature, for inserting slot insulating paper or other insulating material in the armature. Next, a commutator placing station 27, having two vibratory feeders, one to handle the type of commutator required by each variation of armature, is provided. Station 27 is the last station in section 100 of the production line. A reject conveyor 113 is provided in case it is determined that any armature produced in section 100 is defective.

Pallets 410 are transferred in a conventional way from conveyor 110 of section 100 to conveyor 210 of section 101. Section 101 consists solely of a plurality of armature winding stations 28. Because the winding process is complex, armature winding machines 28 are not easily adjustable to different variations. Therefore, in the preferred embodiment there would have to be several winding stations 28 to account for the variations. However, it should be understood that it is possible to provide winding machines 28 that are adjustable to more than one variation. In either case, however, there would be several stations 28 because even with only one variation, or with adjustable winding machines 28, the winding process is much slower than the other production steps, so that several winding machines must be provided to keep pallets from backing up after the steps performed in section 100 are carried out. For that reason, section 101 has three conveyors 210, 211, 212. Conveyors 210, 211 correspond substantially to conveyors 110, 111. However, because of the relative slowness of winding stations 28, pallets are transferred to conveyor 212 from conveyor 210 just before reaching its assigned winding station 28, so that the passage of other pallets on conveyor 210 is not impeded. After winding is completed at a particular station 28, the respective pallet is transferred back to conveyor 210 to continue down the production line. Conveyor 211 has the additional function of "loop storage" so that if the winding machines 28 fall behind, any pallets that cannot be worked on are transferred at the end of conveyor 210 onto conveyor 211 and recirculated back to the beginning of section 101.

Section 102 of the production line has two conveyors 310, 311 similar in function to conveyors 110, 111 and 210, 211, respectively. The first station of section 102 is a plurality of commutator fusing machines 29. Each fusing machine 29 has two sets of apparatus—one for indexing and holding each variation of armature, but is adjustable, pneumatically, for fusing either variation. Again, several machines 29 are provided because of speed considerations, and conveyor 312 is provided for reasons similar to those for conveyor 212. Next, a pair of wedge inserting machines 30, one for each variation of armature, is provided. These are similar in function to slot insulating machines 26. An armature testing station 31 with high voltage test apparatus is capable of handling both variations of armature. After testing at station 31, the armatures that pass the test move on to trickle impregnation station 32 where they are impregnated with a resin that bonds the coils together. Station 32 can handle both variations of armature. Armatures that do not pass the test at station 31 move to reject conveyor 313. Next, a separate commutator turning station 33 is provided for each variation of armature. A balancing station 34 checks that the armatures, of either variation, are balanced, and finally, at station 35, identical to station 31, they are tested again, in case any faults may have developed as a result of the resin impregnation or subsequent processing steps. Armatures that do not pass the test at station 35 move to reject conveyor 314.

Figure 6:
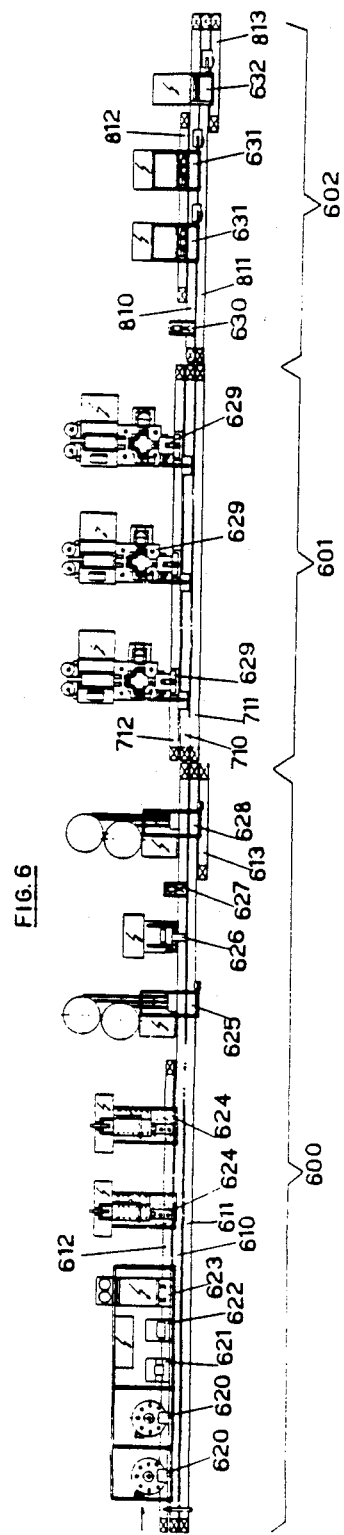
FIG. 6 is a schematic plan view of a production line according to the invention for manufacturing stators.
Figure 7:
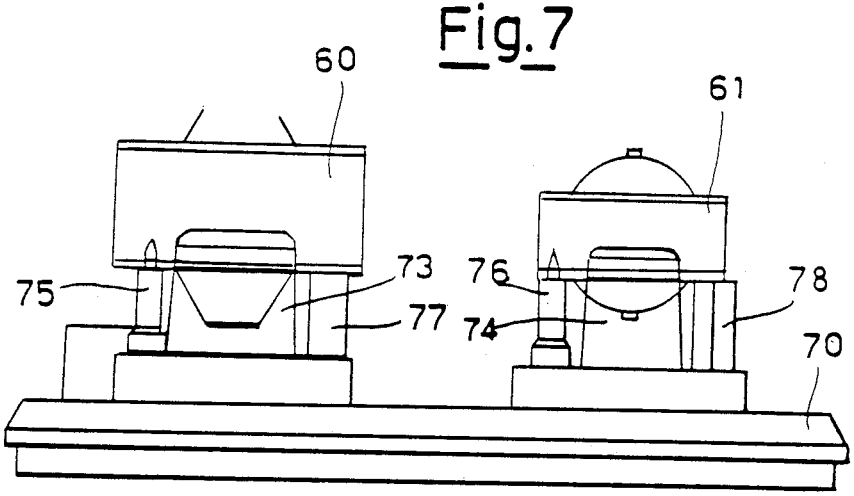
FIG. 7 is a side elevational view of a pallet for carrying a stator, with a stator shown in phantom.
Figure 8:
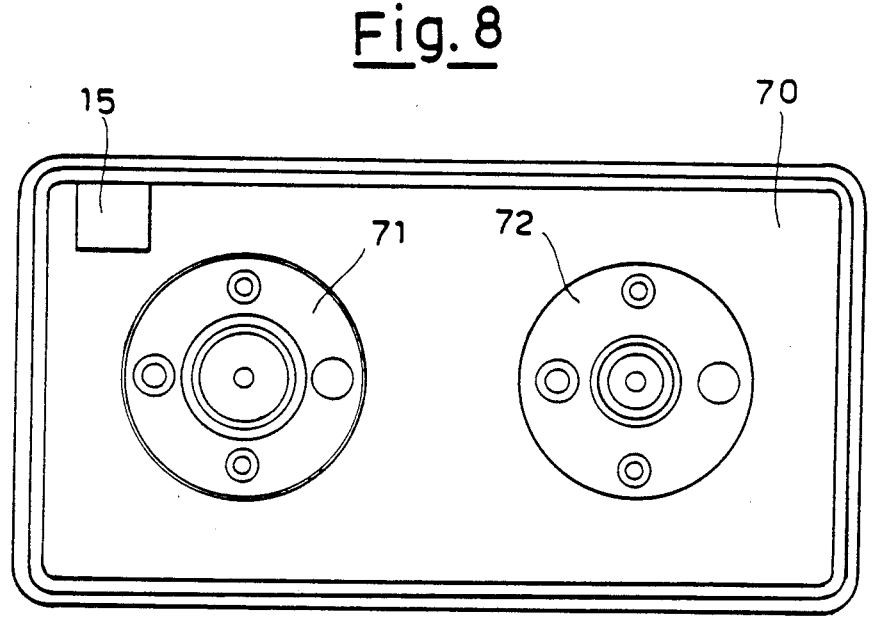
FIG. 8 is a plan view of a pallet for carrying a stator, with a stator shown in phantom.

A preferred embodiment of a production line for the production of two variations of stators is illustrated in FIG. 6, and, like the armature production line of FIG. 1, has three sections 600, 601 and 602. For the purpose of carrying stators along the production line, pallet 70, illustrated in FIGS. 7 and 8, is provided. Pallet 70, like pallet 10, has two fixed supports 71, 72, respectively having fixed heads 73, 74, pins 75, 76, and posts 77, 78, of different sizes for holding stators 60, 61 of different dimensions. Pallet 70 also includes an encoding element 15, as in the case of pallet 10, where the information relating to the stator or stators carried by pallet 70 is stored. As in the case of pallet 10 with respect to armatures, pallet 70 may carry only one stator at a time or, if both variations are being produced at once, pallet 70 may carry two stators at a time.

Like the armature production line of FIG. 1, the stator production line of FIG. 6 begins with a lamination stacking station having two lamination selection units 620 for selecting and stacking stator laminations, one unit 620 for each variation of stator. The stator laminations are stacked on pallet 70 by one of the units 620 according to the information stored by element 15. After the stator laminations are stacked at station 620, the height of the stack of laminations is checked at stack height control station 621, adjustable to either variation of stator, and if the stack height is not correct, stack height compensating station 622, also adjustable to either variation, is capable of either removing laminations from, or adding laminations to, the stack as necessary. Next, stator core welding station 623 welds the stack to form the stator core.

Station 624 includes two machines, one for each variation of stator, for inserting slot insulating paper or other insulating material in the stator. Next, a terminal board placing station 625, having two vibratory feeders, one to handle the type of plastic terminal board required by each variation of stator, is provided to place the plastic terminal boards on the stator. Terminals are inserted into the terminal boards at station 626 which, like station 625, has two vibratory feeders, one to handle the type of terminal required by each variation of stator. Station 627, adjustable to either variation of stator, rotates the stator so that plastic terminal boards can be placed on the second side by station 628, identical to station 625. If additional terminals over those placed at station 626 are required for the particular type of stator being made, then a second terminal inserting station (not shown), identical to station 626, can be provided following station 628. Station 628, or the additional terminal inserting station (not shown), is the last station in section 600 of the production line of FIG. 6. Reject conveyor 613 is provided for those stators determined to be defective while in section 600.

Section 601 of the production line of FIG. 6, like section 101 of the production line of FIG. 1, consists solely of winding stations 629. Again there are several winding stations 629 provided, for both speed and to account for different variations, as discussed above in connection with the armature production line of FIG. 1.

Section 602 of the production line of FIG. 6 begins with station 630 which rotates the stator to a position in which its terminals face upwards. After the coil winding performed at stations 629, the terminals may not face in the desired direction. A hot stacking station or stations 631 are provided to terminate the coil leads to the terminals. As shown, a separate machine 631 is provided for each variation of stator and conveyor 512 is used to direct stators to the correct machines 631; however, a single adjustable machine may also be provided.

Finally, a stator bonding and testing station 632 is provided. The coils of stators made on the production line of FIG. 6 are preferably made using a type of wire having a coating which, when heated, will bond the coils. At station 632, the coils are tested by passing current through them. At the same time, the coils heat up, and bonding occurs. Of course, some other type of bonding could be used, such as resin bonding as in the armature production line of FIG. 1. In such a case, station 632 would only be used for testing. Those stators that do not pass the test at section 632 are moved to reject conveyor 813.

The conveyor system of the production line of FIG. 6 is similar to that of FIG. 1, except that unlike section 100, section 600 has a fourth conveyor 612 which, like conveyor 212 in FIG. 1, facilitates the movement of pallets 70 to different machines at the various stations in section 600, according to the variations of stator being produced.

Figure 9:
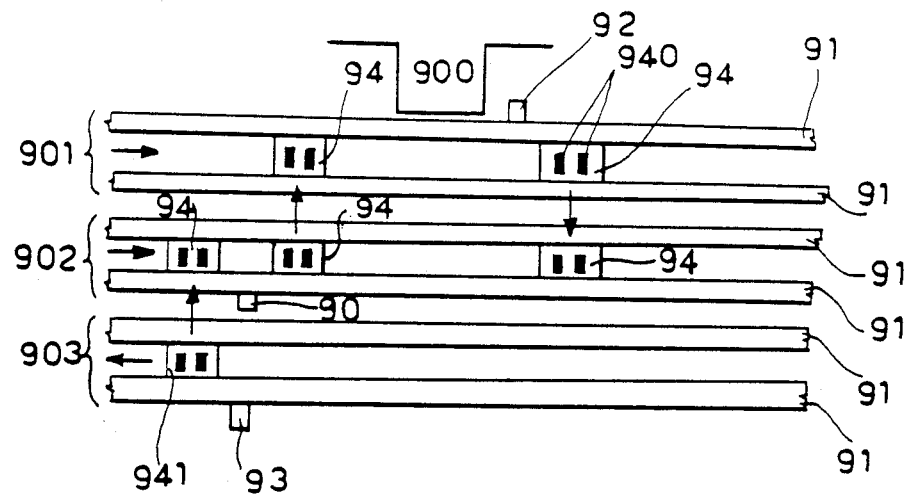
FIG. 9 is a plan view of a portion of the production line of either of FIGS. 1 and 6.

In both preferred embodiments, code element 15 is magnetic, and magnetic readers 90, shown schematically in FIG. 9, are provided adjacent all workstations and conveyor transfer points. As shown in FIG. 9, which depicts a plan view of any portion of the production line on which there are three conveyors, each conveyor 901, 902, 903 includes two parallel belts 91, running together in the same direction. As a pallet 10, 410 or 70 passes reader 90, reader 90 determines the next operation to be performed on the workpiece carried by the pallet, and instructs the upcoming workstation 900 accordingly. Each reader 90 can be connected directly to the adjacent workstation with which it is associated, or all readers 90 can be connected to a central control system, which may include a computer or microprocessor, to which the workstations are also connected. If the reader 90 is associated with a workstation of the type using a different machine to operate on each variation, then in addition to preparing the workstation, reader 90 will also initiate a transfer unit 94 to move the pallet 10, 410 or 70 onto the correct conveyor. Such a transfer unit might include sideways conveyors 940 which would rise up between belts 91 and cause pallet 10, 410 or 70 to move sideways to the next conveyor. Of course, any other suitable apparatus could be used. A writing unit 92 is preferably placed alongside the conveyor system after each workstation so that the status of a workpiece after passage through a workstation could be recorded. For example, it may be determined at a workstation that a workpiece is defective and should be rejected Alternatively, because the line is too busy, a pallet may bypass a workstation and not be worked on. A reader 90 could be placed at the end of a line section (100, 101, 102, 600, 601, 602) to detect rejects, which are diverted off the line, as well as to detect when a pallet must be returned to the beginning of a section (via conveyor 111, 211, 311, 611, 711 or 811) because it carries a workpiece that was not worked on at some station (e.g., to implement the "loop storage" referred to above when the production line becomes too busy). Finally, a workpiece detector 93 can be provided adjacent return conveyor 903 so that if a returning pallet includes a workpiece (i.e., "loop storage" is in effect), that pallet can be transformed by transfer unit 941 back to conveyor 902, where reader 90 can determine its destination.

Thus it is seen that production line capable of producing more than one variation of a particular type of electric motor component is provided. One skilled in the art will appreciate that the present invention can be practiced by other than the described embodiments, which are presented for purposes of illustration and not of limitation, and the present invention is limited only by the claims which follow.

What is claimed is:

1. A production line for producing at least two variations of a type of wound electric motor component, said production line comprising:

a plurality of workstations for producing wound electric motor components, at least a first one of said workstations having at least one machine capable of being adjusted automatically on demand to work on any one of at least two said variations of said type of wound electric motor component, and at least a second one of said workstations having at least two machines for working on wound electric motor components, each of said at least two machines being capable of working on different ones of said at least two variations of said type of wound electric motor component, one of said at least a second one of said workstations being a winding station, said winding station comprising a respective number of winding machines for each said variations of said type of wound electric motor component, said respective numbers relating to one another according to the expected frequencies of occurrence of each said variation;

conveyor means for transporting said wound electric motor components between said workstations;

pallet means for supporting said wound electric motor components during transportation by said conveyor means and during working at said workstations; and means associated with each of said workstations for determining which variation of said type of wound electric motor component is present at said workstation and, responsive to said determinations, for, when said determination is made at said first workstation, automatically adjusting a machine at said first workstation to work on said variation of said type of wound electric motor component, and, when said determination is made at said second workstations, automatically directing said pallet to an appropriate one of said machines.

2. The production line of claim 1 wherein said type of wound electric motor component is an armature.

3. The production line of claim 2 wherein said armature has a primary axis, and said pallet means includes a first pallet for holding said armature with its primary axis vertical along part of said production line and a second pallet for holding said armature with its primary axis horizontal along another part of said production line 4. The production line of claim 1 wherein said type of wound electric motor component is a stator.

5. The production line of claim 1 wherein:

said pallet means includes indicating means for indicating which variation of said type of wound electric motor component is on said pallet; and said means associated with each workstation includes reader means for reading said indicating means, and means responsive to said reading means for adjusting said machine to said indicated variation of said type of wound electric motor component.

6. The production line of claim 1 wherein:

said pallet means includes indicating means for indicating which variation of said type of wound electric motor component is on said pallet;

said conveyor means includes a primary conveyor and at least one secondary conveyor, said at least one secondary conveyor being associated with said workstations having at least two machines each capable of working on a different one of said at least two variations of said type of wound electric motor component; and said means associated with each workstation includes reader means for reading said indicating means, and means responsive to said reading means for (a) transferring pallets between and among said primary and secondary conveyors if said workstation is one having at least two machines each capable of working on a different one of said at least two variations of said type of wound electric motor component, and (b) adjusting said machine to said indicated variation if said workstation is one having a machine capable of working on all of wound said variations of said type of electric motor component.

7. The production line of claim 5 wherein said means associated with each workstation further comprises writing means for writing on said indicator means the current status of said wound electric motor component.

8. The production line of claim 5 wherein said indicating means is magnetic.

9. The production line of claim 5 wherein said indicating means is electronic.

10. The production line of claim 5 wherein said indicating means is mechanical.

11. The production line of claim 5 wherein said indicating means is electromechanical.

* * * * *

UNITED STATES PATENT AND TRADEMARK OFFICE
CERTIFICATE OF CORRECTION

PATENT NO.  : 4,984,353
DATED       : January 15, 1991
INVENTOR(S) : LUCIANO SANTANDREA AND MASSIMO LOMBARDI It is certified that error appears in the above-identified patent and that said Letters Patent is hereby corrected as shown below:

| Column | Line | |
|---|---|---|
| 1 | 65 | After the period, insert -- Means associated with each of the workstations--. |

Signed and Sealed this

Twelfth Day of April, 1994

Attest:

BRUCE LEHMAN

Attesting Officer

Commissioner of Patents and Trademarks